United States Patent
Mao et al.

(10) Patent No.: US 8,564,984 B2
(45) Date of Patent: Oct. 22, 2013

(54) SOFT SWITCHING DC/DC CONVERTERS AND METHODS

(75) Inventors: Hengchun Mao, Plano, TX (US);
Dianbo Fu, Richardson, TX (US);
Zhaozheng Hou, Shenzhen (CN);
Xujun Liu, Shenzhen (CN); Bing Cai, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 446 days.

(21) Appl. No.: 12/964,925

(22) Filed: Dec. 10, 2010

(65) Prior Publication Data
US 2012/0147629 A1    Jun. 14, 2012

(51) Int. Cl.
*H02H 7/122* (2006.01)
*H02M 3/335* (2006.01)

(52) U.S. Cl.
USPC ................... 363/56.02; 363/21.02

(58) Field of Classification Search
USPC ........ 363/16, 17, 21.02, 56.01, 56.02, 97, 98, 363/131, 132
See application file for complete search history.

(56) References Cited

U.S. PATENT DOCUMENTS

| | | | |
|---|---|---|---|
| 4,864,479 A | 9/1989 | Steigerwald et al. | |
| 5,198,969 A | 3/1993 | Redl et al. | |
| 7,110,269 B2 * | 9/2006 | Cao et al. | 363/21.03 |
| 7,706,156 B2 * | 4/2010 | Hsieh et al. | 363/21.02 |
| 2010/0060180 A1 * | 3/2010 | Muehlschlegel | 315/224 |
| 2012/0014152 A1 * | 1/2012 | Nakamura et al. | 363/126 |

OTHER PUBLICATIONS

Ruan, X., et al., "An Improved ZVS PWM Full-bridge Converter with Clamping Diodes," 35th Annual IEEE Power Electronics Specialists Conference, Aachen, Germany, 2004, pp. 1476-1481.

* cited by examiner

*Primary Examiner* — Matthew Nguyen
(74) *Attorney, Agent, or Firm* — Slater & Matsil, L.L.P.

(57) ABSTRACT

A soft switching apparatus comprises an energy recovery channel formed by two diodes in series connection and a resonant tank formed by an inductor and a capacitor. The soft switching apparatus is coupled to the primary side of a bridge converter. An energy transfer process during L-C resonance helps to reduce the amplitude of the current flowing through the inductor in a freewheeling period. Furthermore, the soft switching apparatus can help to reduce the voltage stress across the secondary switching devices as well as the shoot-through currents flowing through the secondary switching devices, and thus enabling the reduction or elimination of dead time in a secondary synchronous rectifier control scheme.

29 Claims, 19 Drawing Sheets

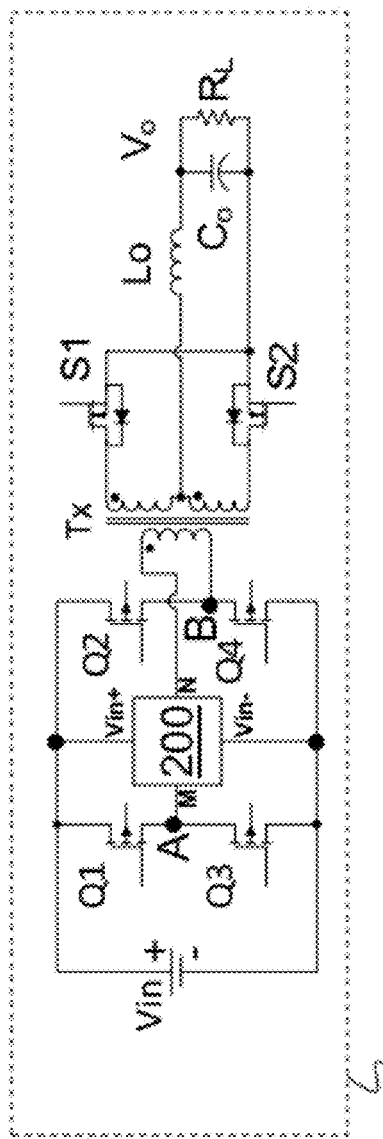
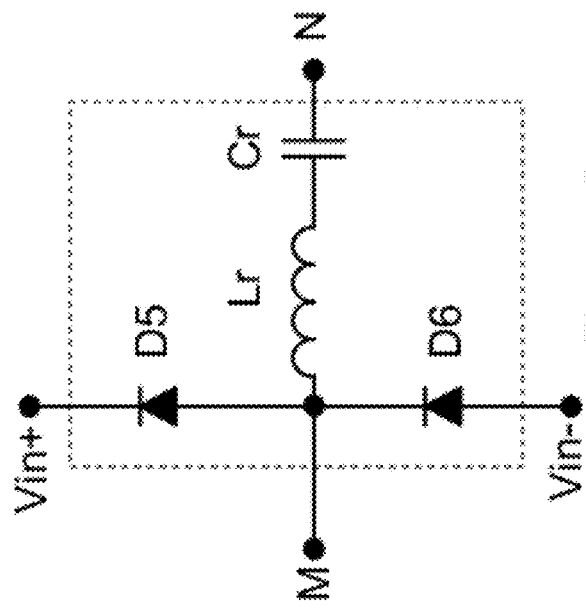
Figure 2A
Figure 2B

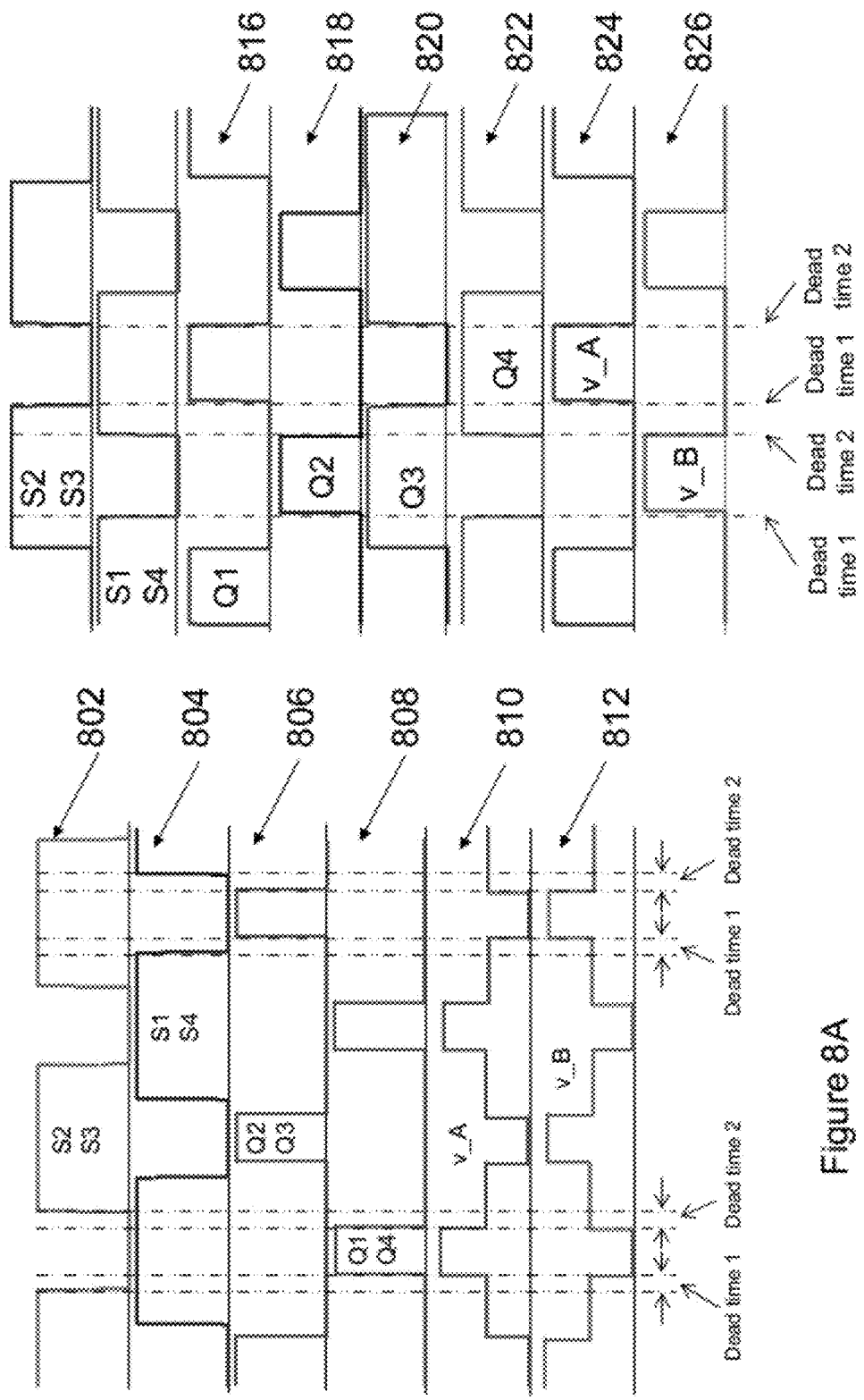

__US 8,564,984 B2__

SOFT SWITCHING DC/DC CONVERTERS AND METHODS

TECHNICAL FIELD

The present invention relates to isolated DC-DC converters and methods, and more particularly, to isolated bridge DC-DC converters and methods employing a soft switching apparatus at a primary side of a transformer.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters and the like. As known in the art, bridge converters generally are employed when the power of a DC-DC converter is more than 100 watts. As shown in FIG. 1, a full bridge converter 100 is a conventional full bridge converter having a full wave rectifier coupled to a center-tapped secondary winding. The full bridge converter 100 includes four switches Q1, Q2, Q3 and Q4 at a primary side of a transformer Tx. The four switches Q1, Q2, Q3 and Q4 form a bridge having two legs. Q1 and Q3 in series connection have a junction point, referred to as A. Q2 and Q4 in series connection have a junction point, referred to as B. The primary winding of the transformer Tx is connected to A and B. A DC supply Vin is connected to the two legs to provide power to the full bridge converter 100. According to the operating principle of a hard switching full bridge converter, the switches Q1 and Q4 are turned on simultaneously for an adjustable time during a first half cycle. After a period of dead time, the switches Q2 and Q3 are turned on simultaneously for an equal time during the second half cycle. As a result, Vin and −Vin are applied to the primary side of the transformer Tx in alternate half periods.

In a fixed duty cycle control scheme, the turn-on time of the switches Q1 and Q4 is equal to the turn-on time of the switches Q2 and Q3. When all four switches are turned off, both S1 and S2 are turned on. The load current flows through S1 and S2. This interval is referred to as a freewheeling period. The output voltage of the bridge converter 100 is proportional to the turn-on time of the switches. A controller (not shown) may detect the output voltage Vo and adjust the turn-on time via a negative feedback control loop (not shown). The secondary side of the transformer Tx is center-tapped. Such a center-tapped secondary and two switches S1 and S2 can form a full wave rectifier, which can convert the primary voltage having double polarities (Vin and −Vin) of the transformer Tx to a secondary voltage having a single polarity. Then, the secondary voltage having a single polarity is fed to an output filter including an inductor Lo and an output capacitor Co. The output filter averages the square voltage pulses at the output of the full wave rectifier and generates a DC voltage at Vo, which is then supplied to a load represented by a resistor RL.

The conventional full bridge converter described above may have large magnetic components. In order to reduce the size of the magnetic components such as the transformer Tx and the output inductor Lo, the switching frequency may be increased to a higher level so as to reduce the transformer and the inductor in size. Consequently, the power density of a full bridge converter can be increased substantially. However, as the switching frequency of full bridge converters increases, the total efficiency is reduced due to extra switching losses in response to a higher switching frequency. Therefore, there is a need to have a soft switching full bridge converter to reduce switching losses.

A phase shift full bridge converter is capable of reducing switching losses by means of the zero voltage switching control technique. As shown in a dashed rectangle 120 of FIG. 1, instead of turning on two primary switches (e.g., Q1 and Q4) simultaneously, the turn-on time of these two switches are shifted by a period of time. More particularly, as depicted in the dashed rectangle 110, a waveform 106 and a waveform 110 show Q1 is on for a period of time before Q4 is turned on. There is an overlap between Q1's turn-on time and Q4's turn-on time. After Q1 is turned off, Q4 stays on for a period of time. Likewise, a waveform 108 and a waveform 112 show there is a phase shift between Q2 and Q3's turn-on time. The phase shift full bridge can achieve a zero voltage switching by utilizing the L-C resonance between transformer leakage inductance and MOSFET (e.g., Q1) output capacitance. For example, Q3 has a parasitic capacitor (not shown) across its drain and source. During the period when both Q1 and Q4 are on, the voltage across Q3's parasitic capacitor is charged to a voltage approximately equal to Vin. According to the basic principle of the phase shift control technique, Q1 is off prior to Q4. After Q1 is off, the primary side current cannot change instantaneously. As a result, the primary side current will flow through the parasitic capacitors of Q1 and Q3. The flow of the primary side current through both parasitic capacitors may cause the voltage at the junction between Q1 and Q3 to be discharged to zero, enabling a zero voltage switching when Q3 is turned on without substantial power loss. Similarly, the phase shift operation may enable lossless turn-on of other switches, namely Q1, Q2 and Q4.

As described above with respect to FIG. 1, a phase-shift full bridge converter may reduce the switching losses by employing a zero voltage switching technique. However, the primary side may have a large amount of current stress due to the primary side switches' longer conduction time of the primary current having an amplitude close to the peak current during a freewheeling period, and the reverse recovery of second switches' body diodes may cause further power losses.

SUMMARY OF THE INVENTION

These and other problems are generally solved or circumvented, and technical advantages are generally achieved, by preferred embodiments of the present invention which provide a system, apparatus and method for reducing the current and voltage stress of a bridge converter.

In accordance with an embodiment, a system for reducing the current and voltage stress of a bridge converter comprises a transformer having a primary and secondary winding, a bridge circuit having at least one leg coupled to the primary winding, a rectifier coupled to the secondary winding, and a soft switching apparatus. The soft switching apparatus comprises a first diode having an anode and a cathode coupled to a positive terminal of a DC source and a second diode having an anode coupled to a negative terminal of the DC source and a cathode connected to the anode of the first diode. The soft switching apparatus further comprises an inductor and a capacitor, which are connected in series and coupled to the two diodes and the primary winding. In the system, the inductor and the capacitor form a resonant tank. Moreover, the capacitor helps to reduce a current in the inductor during a freewheeling period.

In accordance with another embodiment, a method of reducing the current and voltage stress of a bridge converter is disclosed. The method includes providing a bridge having at least one leg and a transformer having a primary winding and a second winding. The primary winding is serially connected to an inductor and a capacitor. The method further includes providing an energy recovery channel formed by two diodes in series connection and forming a resonant tank by placing the inductor, the capacitor and the primary winding in series connection. Furthermore, the method includes coupling a rectifier to the secondary winding, coupling the energy recovery channel to the resonant tank at a junction point of the resonant tank, coupling a first terminal of the resonant tank to a junction point of a first leg of the bridge and coupling a second terminal of the resonant tank to a junction point of a second leg of the bridge. The method can reduce a current flowing through the inductor by at least 20% during a freewheeling period through an L-C resonant process between the inductor and the capacitor. The method also limits shoot-through currents flowing through the rectifier by using the inductor as a current limiting element. Furthermore, the method reduces the voltage stress across the rectifier by means of the resonant tank and the energy recovery channel.

An advantage of a preferred embodiment of the present invention is reducing the voltage and current stress of a bridge converter so as to improve the bridge converter's reliability and efficiency.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A illustrates a full bridge converter including a soft switching apparatus;

FIG. 2B illustrates the schematic diagram of the soft switching apparatus shown in FIG. 2A;

FIG. 8A illustrates a conventional way to solve the shoot-through issue by using dead time;

FIG. 8B illustrates the reduction of dead time in a full bridge converter having the soft switching apparatus;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a full bridge converter having a soft switching apparatus. The invention may also be applied, however, to a variety of bridge converters including half bridge and full bridge converters.

Figure 1:
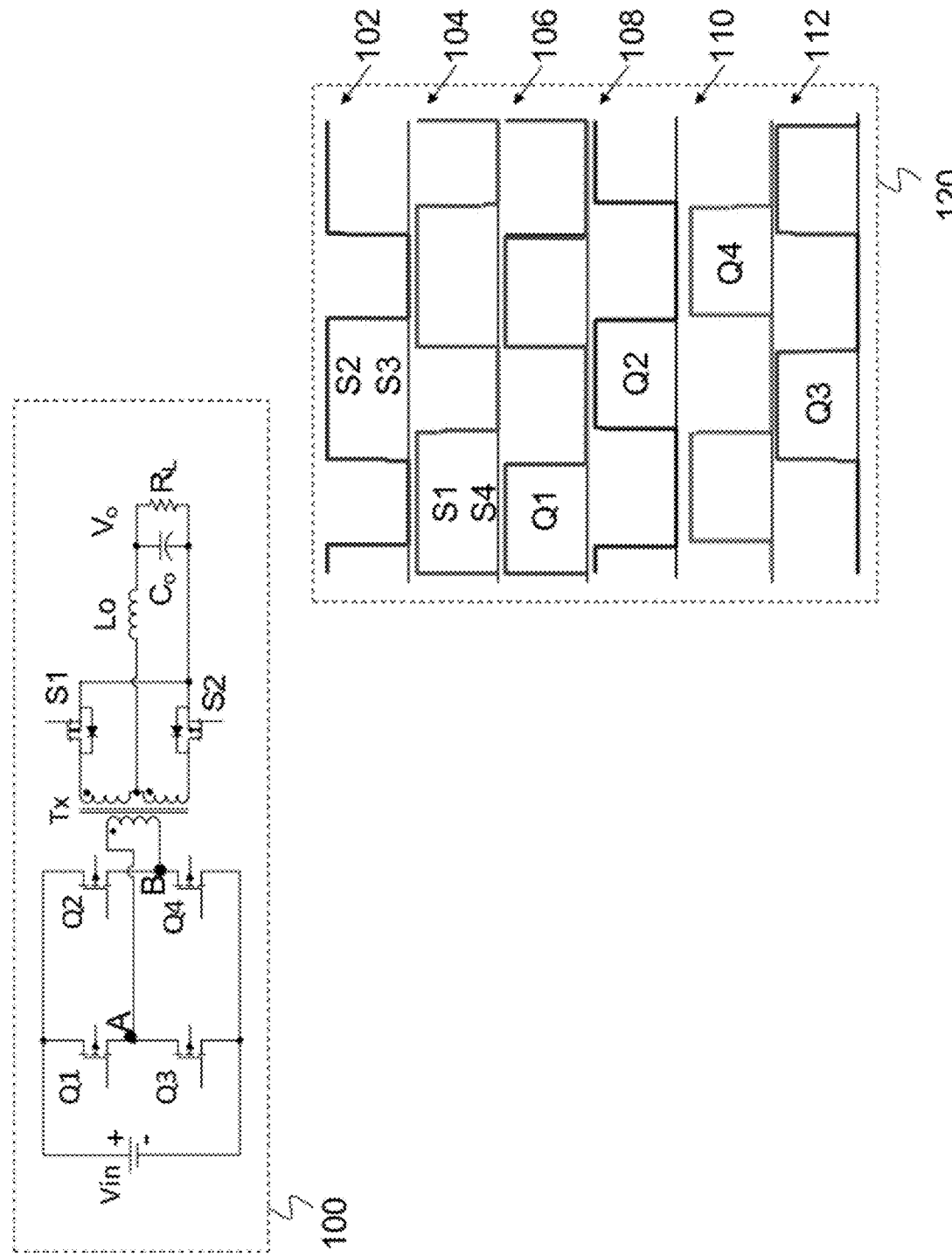
FIG. 1 illustrates a full bridge converter having a full wave rectifier.

Referring initially to FIG. 2A, a full bridge converter including a soft switching apparatus is illustrated. The basic operation principle of a full bridge converter has been described above with respect to FIG. 1. A soft switching apparatus 200 includes four terminals. As shown in FIG. 1, two terminals of the soft switching apparatus 200 are connected to the positive terminal and the negative terminal of Vin respectively. The other two terminals are connected to the junction of Q1 and Q3, referred to as A, and one end of the primary side of the transformer Tx, respectively. It should be noted that the soft switching apparatus 200 and the primary side of the transformer Tx are in series connection. A person having ordinary skill in the art will recognize that a position exchange between the soft switching apparatus 200 and the primary side of the transformer Tx is still within the scope of the present invention.

As shown in FIG. 2B, the soft switching apparatus 200 includes two diodes D5 and D6, an inductor Lr and a capacitor Cr. D5 and D6 are in series connection. More particularly, the anode of D5 is connected to the cathode of D6. The junction between D5 and D6 is connected to one end of Lr. The other end of Lr is connected to Cr. It should be noted that because Lr and Cr are in series connection, the location exchange between Lr and Cr has no impact on the electrical characteristics of the soft switching apparatus 200. As a result, an apparatus merely swapping the locations of Lr and Cr is within the scope of the present invention. Furthermore, after the soft switching apparatus 200 is added into a full bridge converter, as shown in FIG. 1, Lr, Cr and the primary side winding of the transformer Tx are in series connection. For the reason provided above with respect to the location exchange between Lr and Cr, in a circuit having three components in series connection, the connection sequence of Lr, Cr and the primary side winding of the transformer Tx has no impact on the electrical characteristics of the full bridge converter. Therefore, the connection sequence among these three components can be Lr, Cr, the primary side winding of the transformer Tx, or any combination thereof.

Figure 3:
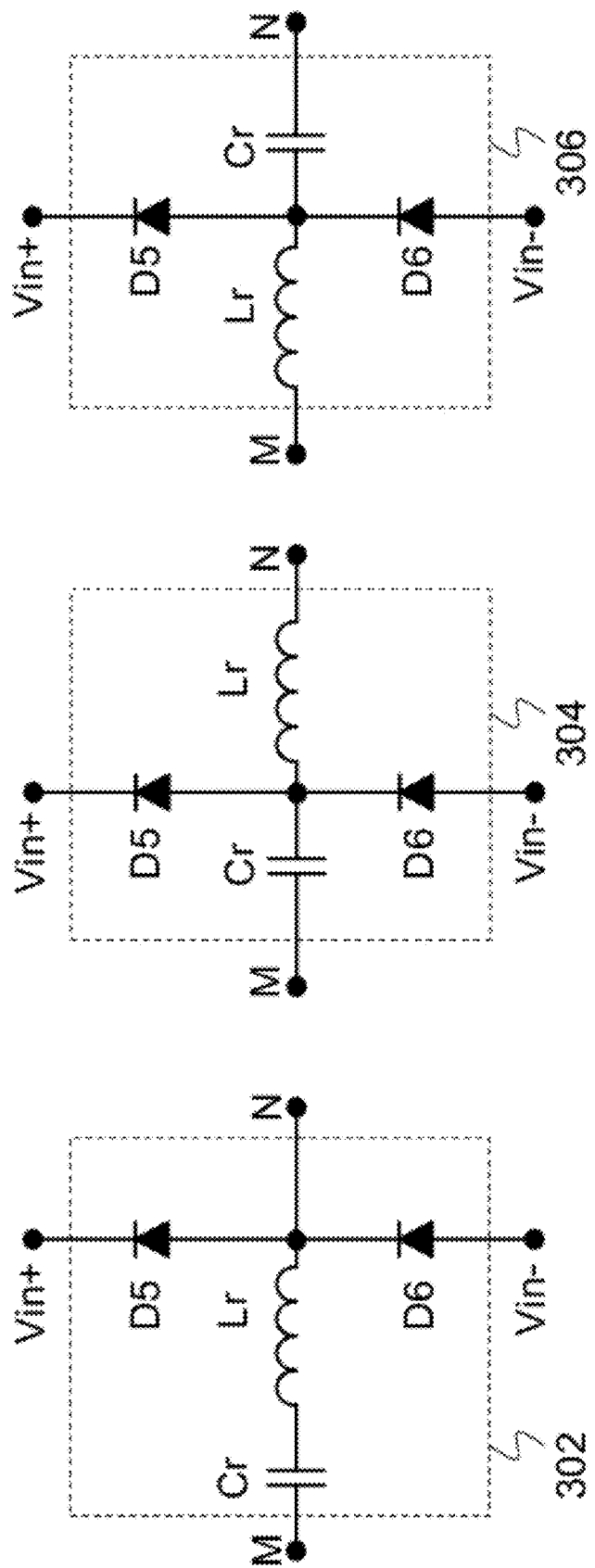
FIG. 3 illustrates a plurality of variations of the soft switching apparatus shown in FIG. 2.

FIG. 3 illustrates a plurality of variations of the soft switching apparatus 200. In the soft switching apparatus 200, Lr and Cr form a resonant tank in which the energy oscillates back and forth between Cr and Lr. D5 and D6 form an energy recovery channel. The resonant energy may be recovered back to the DC supply coupled to the bridge converter through the energy recovery channel. FIG. 3 includes three circuit configurations. A dashed rectangle 302 illustrates an exemplified circuit configuration in which the resonant tank formed by Lr and Cr is placed at the left side of the energy recovery channel formed by D5 and D6. Likewise, in a dashed rectangle 304, Cr and Lr may be placed in a symmetrical pattern. That is, the two components of the resonant tank are symmetrical relative to the energy recovery channel. Similarly, by exchanging Lr and Cr's positions shown in the dashed rectangle 304, a circuit configuration shown in a dashed rectangle 306 can be formed.

It should be noted that while FIG. 3 shows several possible circuit configurations based upon the soft switching apparatus 200, one having ordinary skill in the art will recognize the circuit configurations described above are merely exemplary circuit configurations and are not meant to limit the current embodiments. For example, when the soft switching apparatus 200 is serially connected to the primary side winding of the transformer Tx, the primary side winding may be placed in series with the resonant tank or be placed in between Lr and Cr. All such variations are fully intended to be included within the scope of the embodiments discussed herein.

Figure 4A:
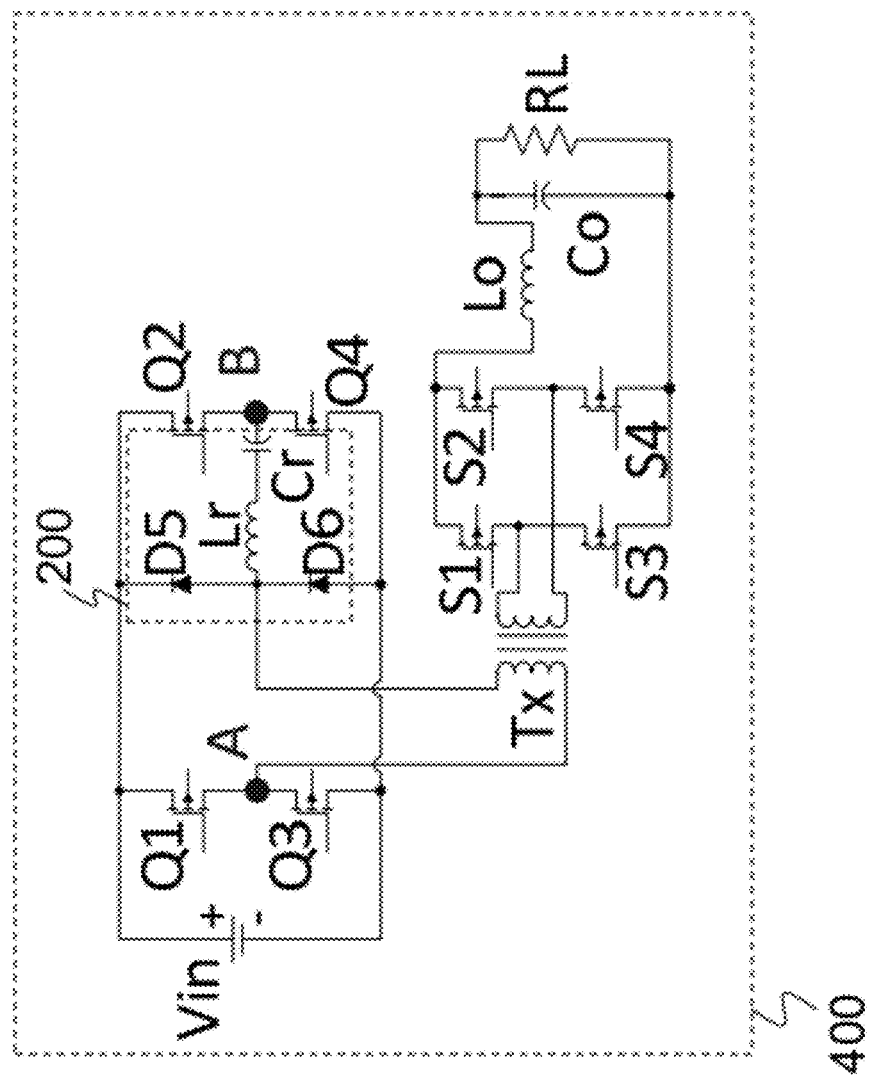
FIGS. 4A-4D illustrate a plurality of variations of the soft switching apparatus coupled to a full bridge converter.

FIG. 4A illustrates a circuit diagram of a full bridge converter 400 having a soft switching apparatus in accordance with an embodiment. The full bridge converter 400 shown in FIG. 4A can be considered having two portions. Along the isolation barrier provided by the transformer Tx, the left side of the transformer Tx into which power flows is called the primary side and the circuit connected to the primary side winding is called the primary circuit of the full bridge converter 400. On the other hand, the right side of the transformer Tx from which power flows is called the secondary side, and the circuit connected to the secondary side winding is called the secondary circuit of the full bridge converter 400. The primary side's circuit diagram has been described in detail with respect to FIG. 1, and therefore not discussed herein. The soft switching apparatus 200 is placed in series with the primary side winding of the transformer Tx. The energy recovery channel of the soft switching apparatus 200 has two terminals. As shown in FIG. 4A, one terminal (the cathode of D5) is connected to the positive terminal of the DC supply Vin and the other terminal (the anode of D6) is connected to the negative terminal of the DC supply Vin.

In FIG. 4A, the secondary circuit of the full bridge converter 400 employs a full wave rectifier formed by a secondary winding and four switches S1, S2, S3 and S4 (these switches are controlled to work as diodes, and such switches are usually called synchronous rectifiers). The operation of the full wave rectifier shown in FIG. 4A is known in the art, and hence is not discussed herein. In comparison to the full bridge converter 100 shown in FIG. 2, the full bridge rectifier shown in FIG. 4A employs a different type of full wave rectifier. Nevertheless, FIG. 4A further illustrates that the soft switching apparatus 200 may be not only applied to a full bridge converter having a center-tapped secondary winding as shown in FIG. 2, but also applied to a full bridge converter having a non center-tapped secondary winding as shown in FIG. 4. Furthermore, the soft switching apparatus 200 is applicable to bridge converters having other secondary configurations, such as voltage doubler rectifiers and current doubler rectifiers. In sum, the soft switching apparatus 200 can be applied to all types of bridge converters, including full bridge converters having different types of secondary configurations, and half bridge converters having different types of secondary configurations. Furthermore, different control techniques of bridge converters have no impact on the application of the soft switching apparatus 200. For example, the soft switching apparatus 200 can be applied to a hard switching full bridge converter as well as a phase shift full bridge converter. A plurality of applicable control techniques will be described in detail later with respect to FIGS. 5A-5E.

Figure 4B:
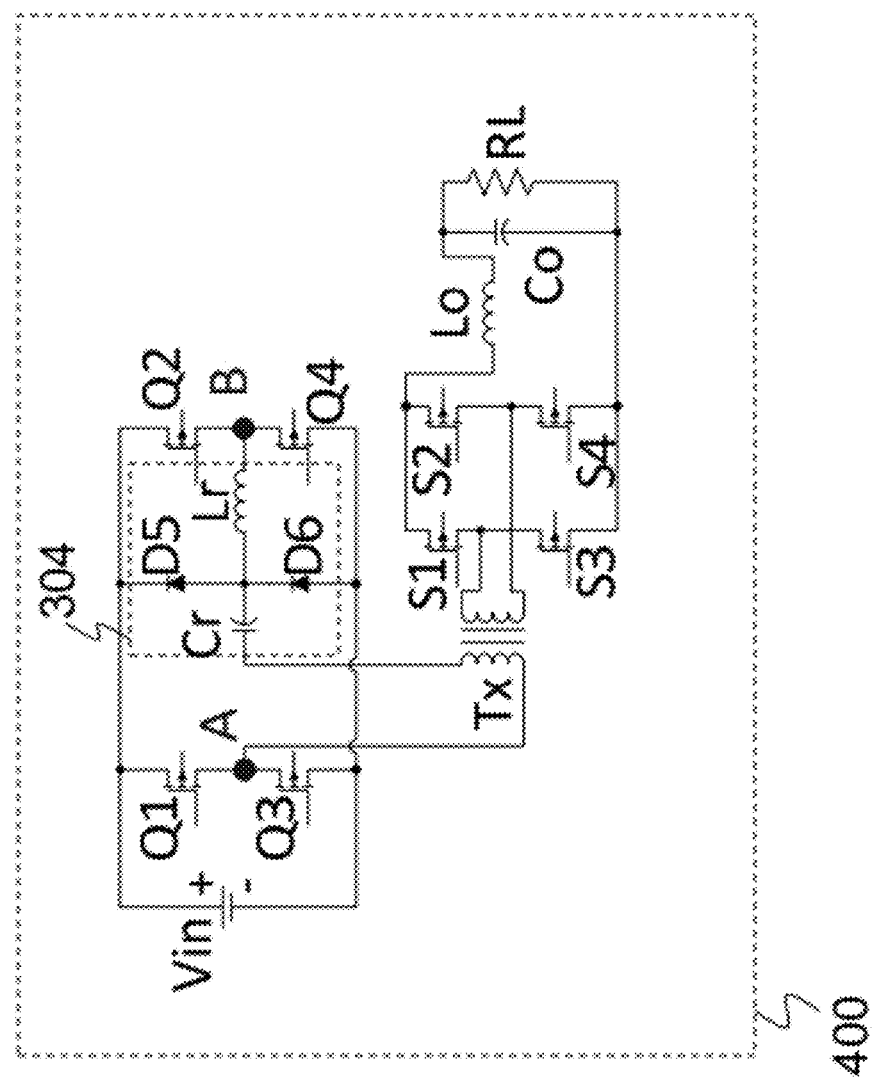
Figure 4C:
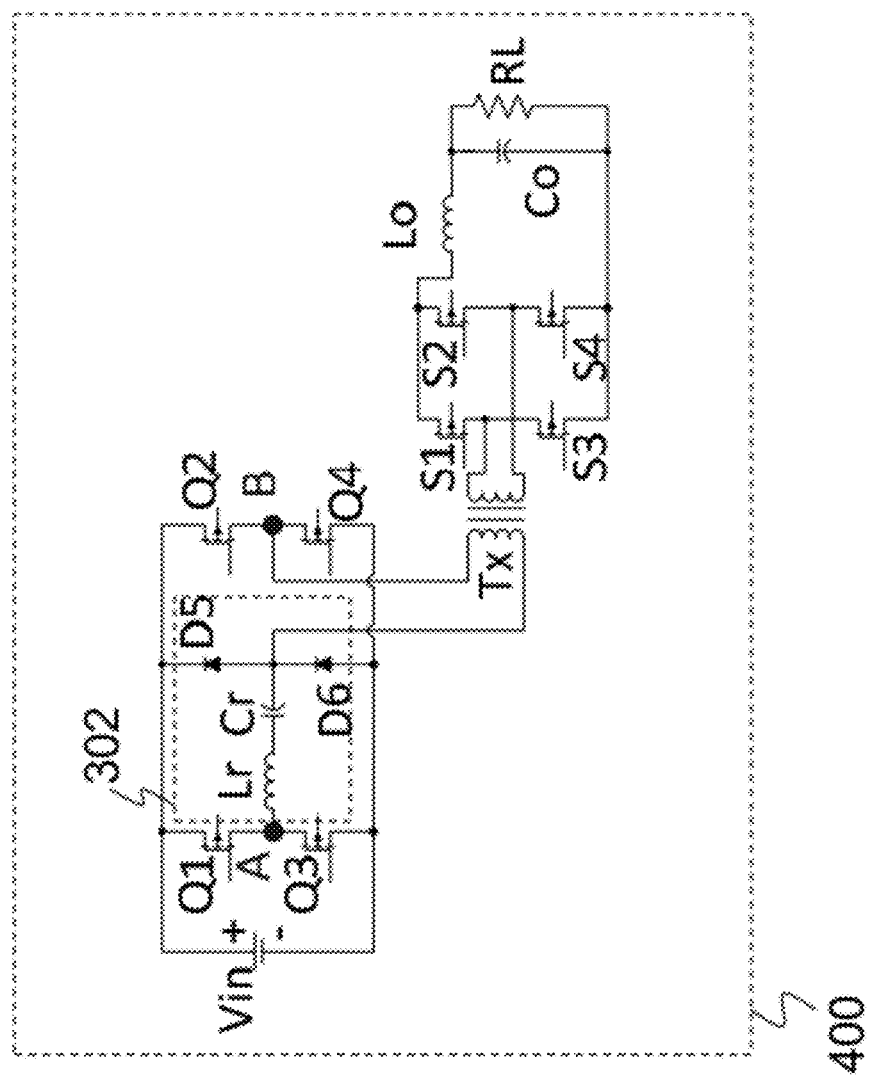
Figure 4D:
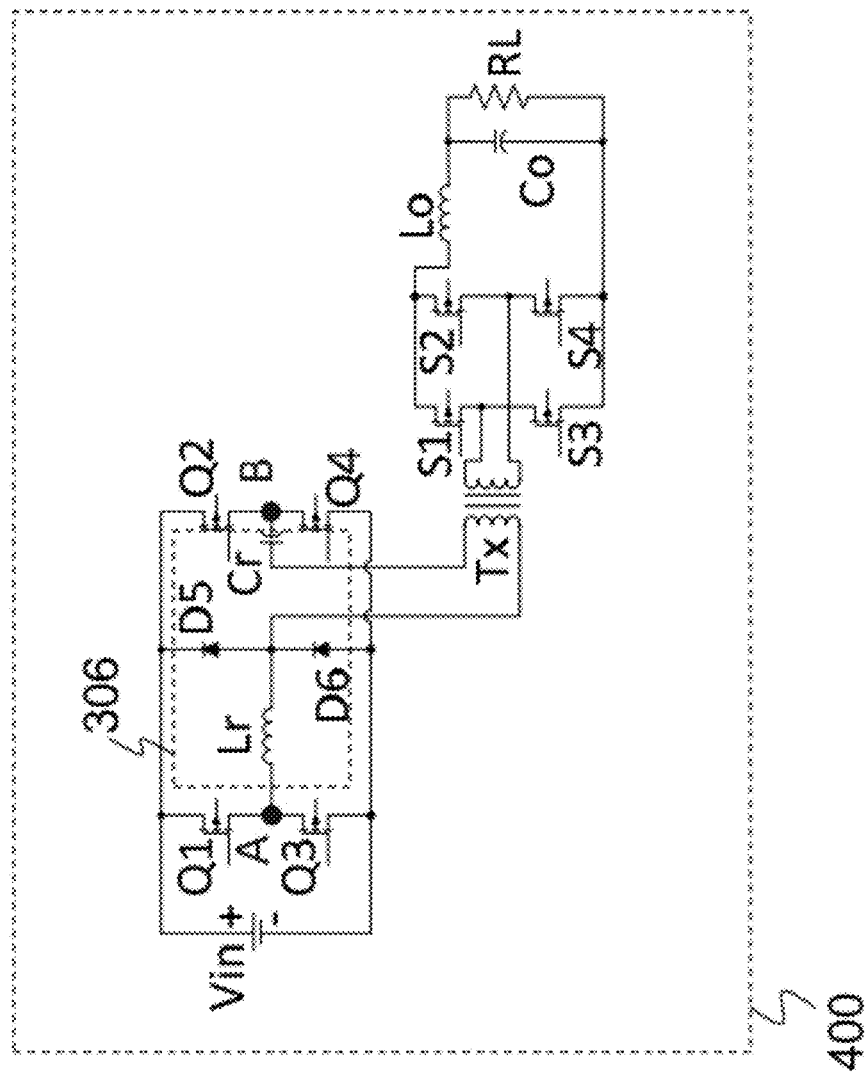

FIG. 4B illustrates another circuit diagram of a full bridge converter 400 having a soft switching apparatus in accordance with an embodiment. The full bridge converter 400 has been described in detail with respect to FIG. 4A. FIG. 4B illustrates the full bridge converter 400 with the soft switching apparatus 304. As described with respect to FIG. 3, the soft switching apparatus 304 is a derivative of the soft switching apparatus 200. The circuit shown in FIG. 4B may have electrical characteristics similar to those of the circuit shown in FIG. 4A. FIGS. 4C and 4D illustrate another two variations, which have electrical characteristics similar to those of the circuit diagram shown in FIG. 4A. More particularly, FIG. 4C includes the full bridge converter 400 with the soft switching apparatus 302 and FIG. 4D includes the full bridge converter 400 with the soft switching apparatus 306. In summary, the derivatives of the soft switching apparatus 200 are within the scope of the present invention.

Figure 5A:
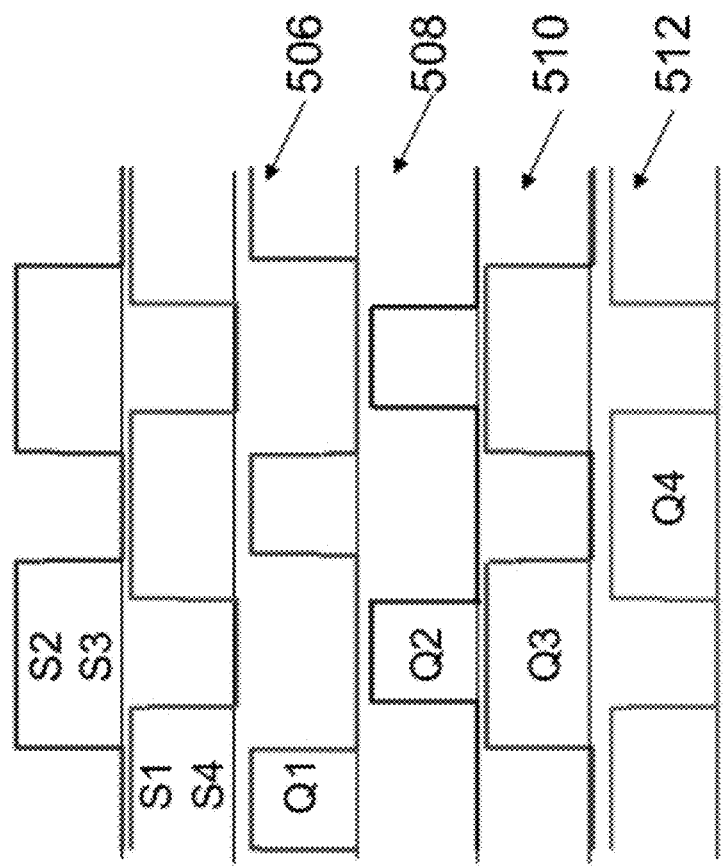
FIGS. 5A-5E illustrates a plurality of control schemes applicable to a bridge converter having the soft switching apparatus.
Figure 5B:
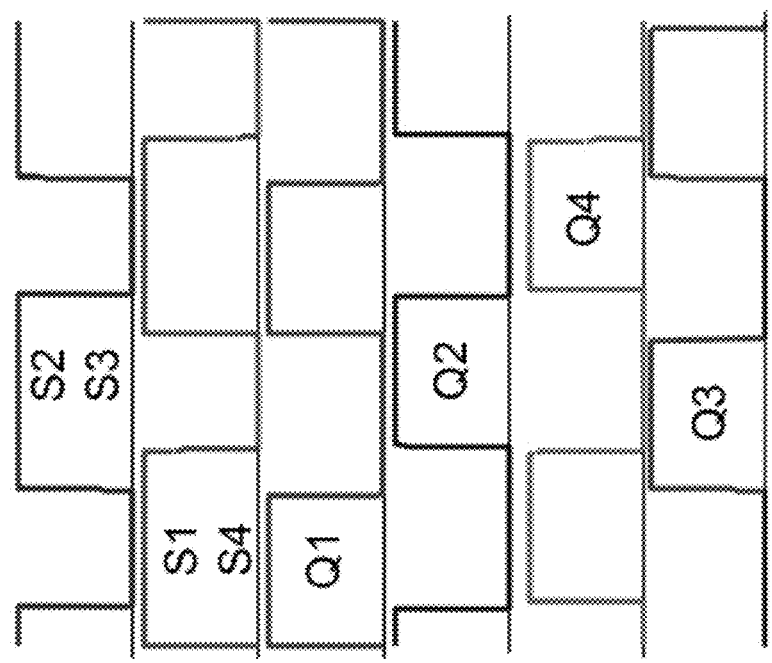
Figure 5C:
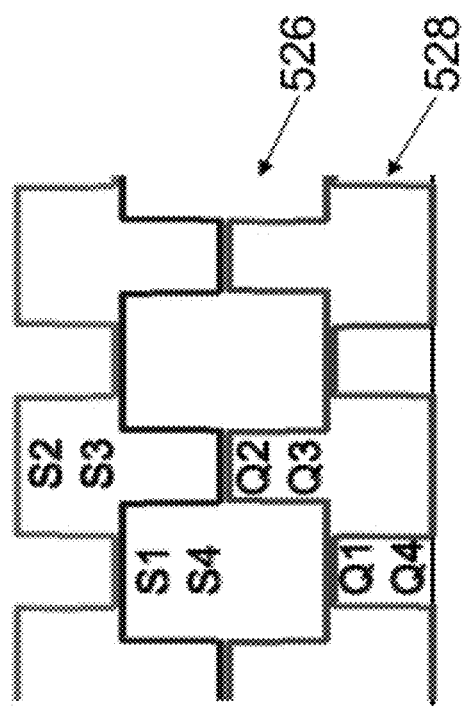

As described above, the soft switching apparatus 200 can be applied to bridge converters having different control schemes. FIGS. 5A-5E illustrates a plurality of control schemes applicable to the bridge converters having the soft switching apparatus 200. In FIG. 5A, the primary switches Q1 and Q3 form a switch pair. Likewise, the primary switches Q2 and Q4 form the other switch pair. Both switches in each switch pair operate in complementary mode, that is, a high side switch (e.g., Q1 shown in a waveform 506) is driven on for a duty cycle D and the corresponding low side switch (e.g., Q3 shown in the waveform 510) is driven on for a duty cycle approximately 1-D in consideration of a short dead time between the conduction of the high side switch and the conduction of the low side switch. A waveform 508 and a waveform 512 show Q2 and Q4 are driven also in complementary mode. According to another embodiment, FIG. 5B shows a conventional phase shift control scheme, which has been described in detail with respect to FIG. 1. FIG. 5C shows a conventional hard switching control scheme, that is, in a waveform 528, Q1 and Q4 are turned on simultaneously for a duty cycle D in a first half period; likewise, in a waveform 526, Q2 and Q3 are turned on simultaneously for a duty cycle D in a second half period.

Figure 5D:
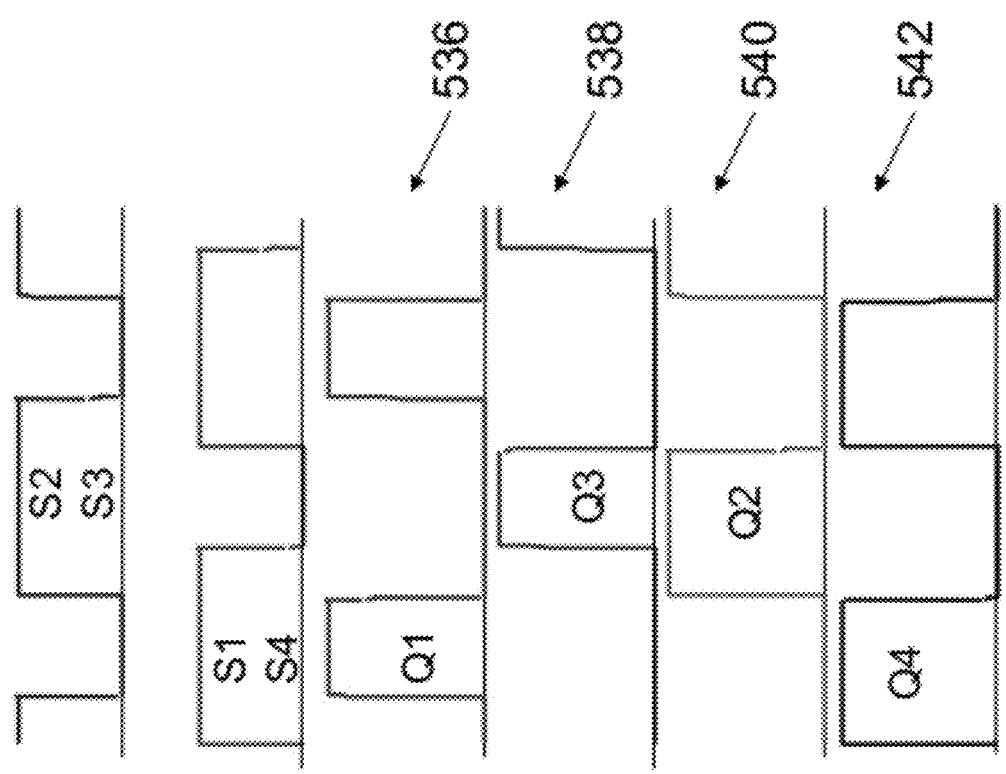
Figure 5E:
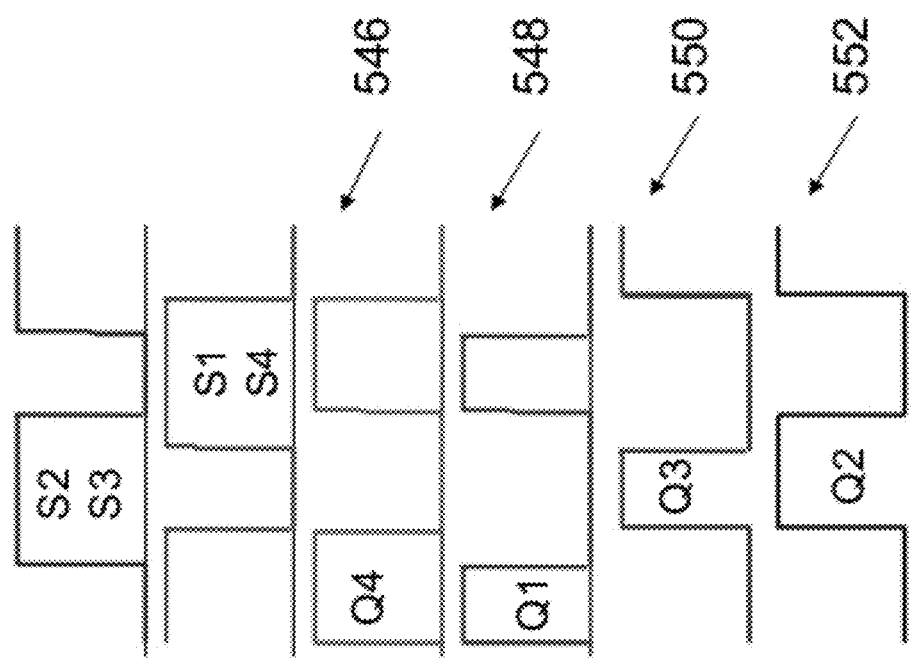

FIG. 5D illustrates a hybrid control scheme, in which two switches (e.g., Q1 shown in a waveform 536 and Q3 shown in a waveform 538) of one leg of the full bridge converter are turned on for a duty cycle D in the first half and the second half of one period. The other two switches (e.g., Q2 shown in a waveform 540 and Q4 shown in a waveform 542) of the other leg operate in complementary mode, which has been described with respect to FIG. 5A. FIG. 5E illustrates a control scheme derived from FIG. 5D. Similar to FIG. 5D, in a waveform 548 and a waveform 550, Q1 and Q3 are turned on for duty cycle D except that the duty cycle shown in FIG. 5E is trailing edge triggered rather than leading edge triggered as shown in FIG. 5D. In FIG. 5E, a waveform 552 and a waveform 546 shows the operation of Q2 and Q4 is similar to that of FIG. 5D. One advantageous feature of the soft switching apparatus 200 is that it can be applied to bridge converters having a variety of control schemes. It should be noted that the control schemes shown above are merely examples, which should not unduly limit the scope of the claims. One of ordinary skill in the art would recognize many variations, alternatives and modifications.

Figure 6A:
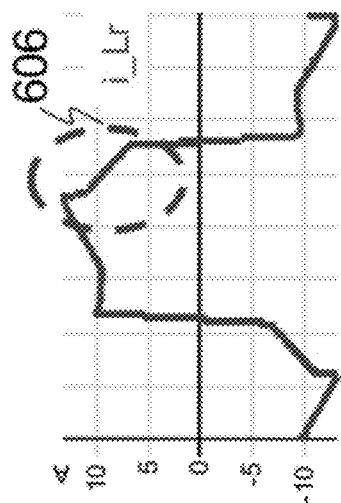
FIG. 6A illustrates a primary side current waveform showing the operation of the full bridge converter shown in FIG. 1.
Figure 6C:
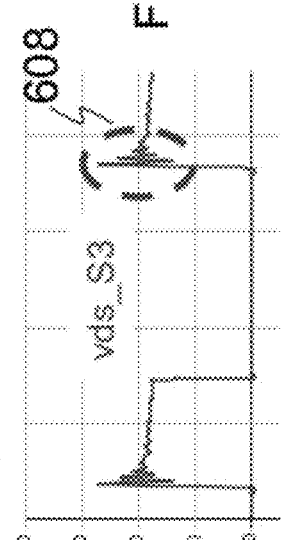
FIG. 6C illustrates the voltage stress of a secondary switch in a conventional full bridge converter.
Figure 6E:
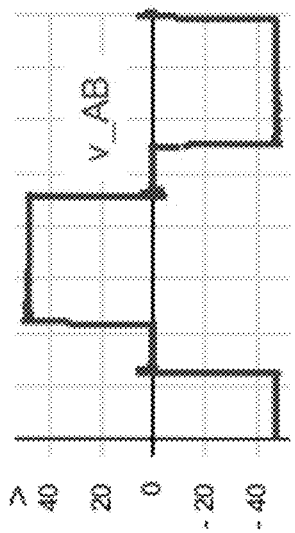
FIG. 6E illustrates a voltage waveform V_AB showing the operation of the full bridge converter shown in FIG. 1.

FIGS. 6A-6F show a number of advantageous features by using the soft switching apparatus 200. FIG. 6A illustrates a primary side current waveform showing the operation of the full bridge converter 100 in FIG. 1. The horizontal axis of FIG. 6A is time. The vertical axis of FIG. 6A represents the current flowing through the primary side of the transformer Tx. FIG. 6E illustrates a voltage waveform across V_AB of the full bridge converter 100 in FIG. 1. The vertical axis of FIG. 6E represents the voltage across two junction points (e.g., junction points A and B shown in FIG. 1). The operation of full bridge converters and corresponding waveforms as shown in FIG. 6A and FIG. 6E are known in the art, and hence are not discussed herein. In order to illustrate the difference between a conventional full bridge converter and a full bridge converter having the soft switching apparatus 200, a dashed circle 602 highlights the amplitude of the primary current in FIG. 6A when the voltage across two junction points A and B in FIG. 6E is approximately zero and the full bridge converter enters a freewheeling period. As shown in FIG. 6A, the current remains approximately 10 A.

Figure 6B:
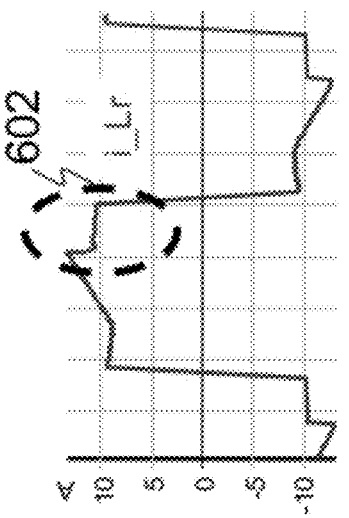
FIG. 6B illustrates a primary side current waveform showing the operation of the full bridge converter shown in FIG. 4A.
Figure 6D:
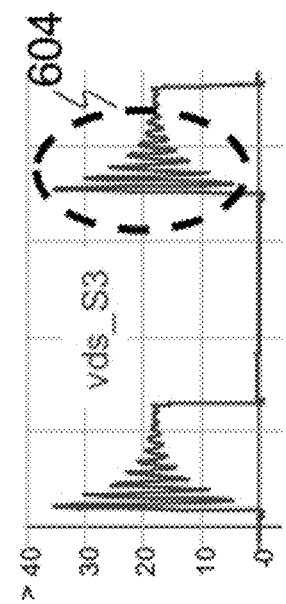
FIG. 6D illustrates the voltage stress of a secondary switch in a full bridge converter having the soft switching apparatus.
Figure 6F:
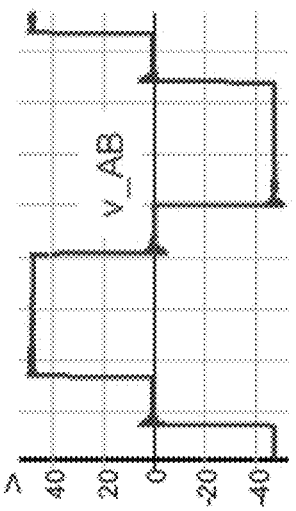
FIG. 6F illustrates a voltage waveform V_AB showing the operation of the full bridge converter shown in FIG. 4A.

FIGS. 6B and 6F illustrate a primary side current waveform and a voltage waveform across V_AB showing the operation of the full bridge converter 400 shown in FIG. 4A. As described above with respect to FIG. 4A, the full bridge converter 400 includes the soft switching apparatus 200. The resonant tank formed by Lr and Cr in the soft switching apparatus 200 is capable of reducing the amplitude of primary current by transferring the energy of Lr into Cr through L-C resonance. As shown in a dashed circle 606, by employing Cr capable of transferring some energy from Lr to Cr, the amplitude of the primary current in a freewheeling period is reduced by at least 20% at full load. Furthermore, the energy stored in Cr will be recovered and transferred to the load. This will be discussed in detail with respect to FIG. 7B.

The soft switching apparatus 200 not only reduces the amplitude of the primary current of a full bridge converter, but also alleviates the voltage stress across the secondary switches. In accordance with an embodiment, FIG. 6C illustrates the voltage stress of a secondary switch (e.g., S3) if the full bridge converter does not include the soft switching apparatus 200. The vertical axis of FIG. 6C represents the voltage across the drain and source of a secondary switch. According to an embodiment, the ringing across Vds_S3 is up to 35V as shown in a dashed circle 604. In contrast, FIG. 6D shows with similar operation conditions the full bridge converter 400 is capable of limiting the ringing across Vds_S3 below 30V. An advantageous feature of the soft switching apparatus 200 is that the energy transfer between Lr and Cr when V_AB is approximately zero can reduce the amplitude of the primary current as well as the voltage stress across the secondary switches.

Figure 7A:
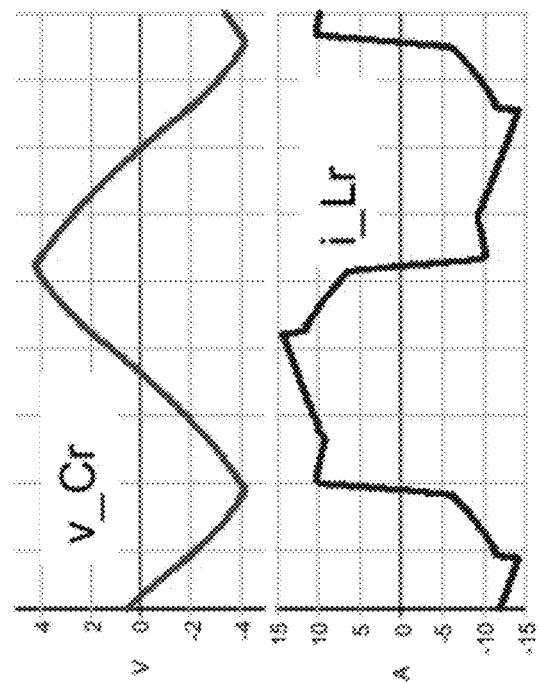
FIGS. 7A and 7B further illustrate the difference between a blocking capacitor in a conventional full bridge converter and the resonant capacitor in the soft switching apparatus.
Figure 7B:
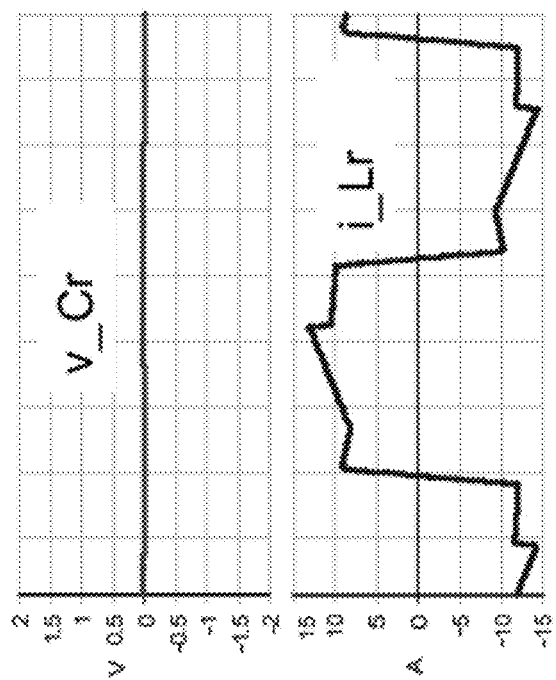

FIGS. 7A and 7B further illustrate the difference between the full bridge converter 400 shown in FIG. 4A and the full bridge converter 100 shown in FIG. 1. In a conventional full bridge converter, such as the full bridge converter 100, it is not uncommon to add a blocking capacitor in series with the primary side of the transformer Tx. However, the blocking capacitor normally has a large amount of capacitance because the function of the blocking capacitor is to generate a DC voltage to cancel the volt-second imbalance across the transformer Tx. The large amount of capacitance of the blocking capacitor causes the voltage across the blocking capacitor to remain almost constant in a switching cycle. As shown in FIG. 7A, the voltage across a blocking capacitor (e.g., V_Cr in FIG. 7A) is approximately zero because the controller maintains duty cycle symmetry between half-cycles according to an embodiment. In contrast, as shown in FIG. 7B, the voltage across Cr (referred to as V_Cr) in the soft switching apparatus 200 varies in a range from −4V to 4V according to an embodiment. The swing of the voltage across Cr represents the energy transfer during L-C resonance, which in a freewheeling period reduces the primary current of the transformer by at least 20%.

In accordance with another embodiment, the soft switching apparatus 200 may alleviate shoot-through and reverse recovery issues existed in a bridge converter having a secondary synchronous rectifier. As known in the art, in order to avoid shoot-through current, an adequate dead time is required to prevent a direct path formed by two fully or partially on switches. FIG. 8A illustrates a conventional way to solve this issue by using dead times. As shown in FIG. 8A, a waveform 802 and a waveform 806 show the conduction of S2 and S3 is terminated before Q1 and Q4 are turned on. The gap between the S2 and S3's turn-off and the Q1 and Q4's turn-on is the dead time 1, during which the current previously flowing through S2 and S3 is transferred to the diodes (not shown), which are usually the parasitic body diodes of the switches S2 and S3. Similarly, the gap between the Q1 and Q4's turn-off and the S1 and S3's turn-on is the dead time 2. In order to prevent shoot-through in all operating conditions, a long dead time may be employed. However, too long a dead time means high conduction losses caused by the higher voltage drop of the diodes and high reverse recovery losses caused by the storage charge of the diodes. On the other hand, too short a dead time may cause shoot-through. Especially, when noise in a converter causes variation in timing, a predetermined short dead time may not be enough to prevent shoot-through of the secondary switches. Such a shoot-through current not only causes high power losses, but also generates high voltage and current stresses, which may detrimentally damage the components of the converter. In FIG. 8A, waveforms 802, 804, 806, 808, 810 and 812 show long dead time 1 and dead time 2 are added between the turn-on pulses of S2, S3 and the turn-on pulses of Q1 and Q4. The typical consideration in the dead time control is to make sure the outgoing secondary switches are turned off before V_AB changes its state.

FIG. 8B illustrates a dead time control scheme based upon the full bridge converter 400. As shown by waveforms 816, 818, 820, 822, 824 and 826, in comparison to FIG. 8A, the dead time 1 and dead time 2 between two pulses are reduced to a level vulnerable to shoot-through. However, Lr in the primary side, as an inductive element, can limit a flow of shoot-through currents. In addition, D5 and D6 (not shown but illustrated in FIG. 2), as clamping elements, can help to reduce the oscillation due to shoot-through. One additional advantageous feature of the soft switching apparatus 200 is that it not only reduces unnecessary power losses resulted from a long dead time, but also improves the reliability of bridge converters by alleviating the shoot-through issues. Because of the soft switching apparatus 200, it is possible to eliminate the dead time so that the current in the secondary side may not flow through any diode during normal operation. Furthermore, the conduction of the switches being turned off (e.g., S2 and S3 in FIG. 8B) can be extended to a point, which is slightly after the point at which V_A changes from low to high, so that the dead time becomes negative. In sum, the soft switching apparatus 200 can improve the operation of a converter by reducing the dead time of the converter.

Figure 9:
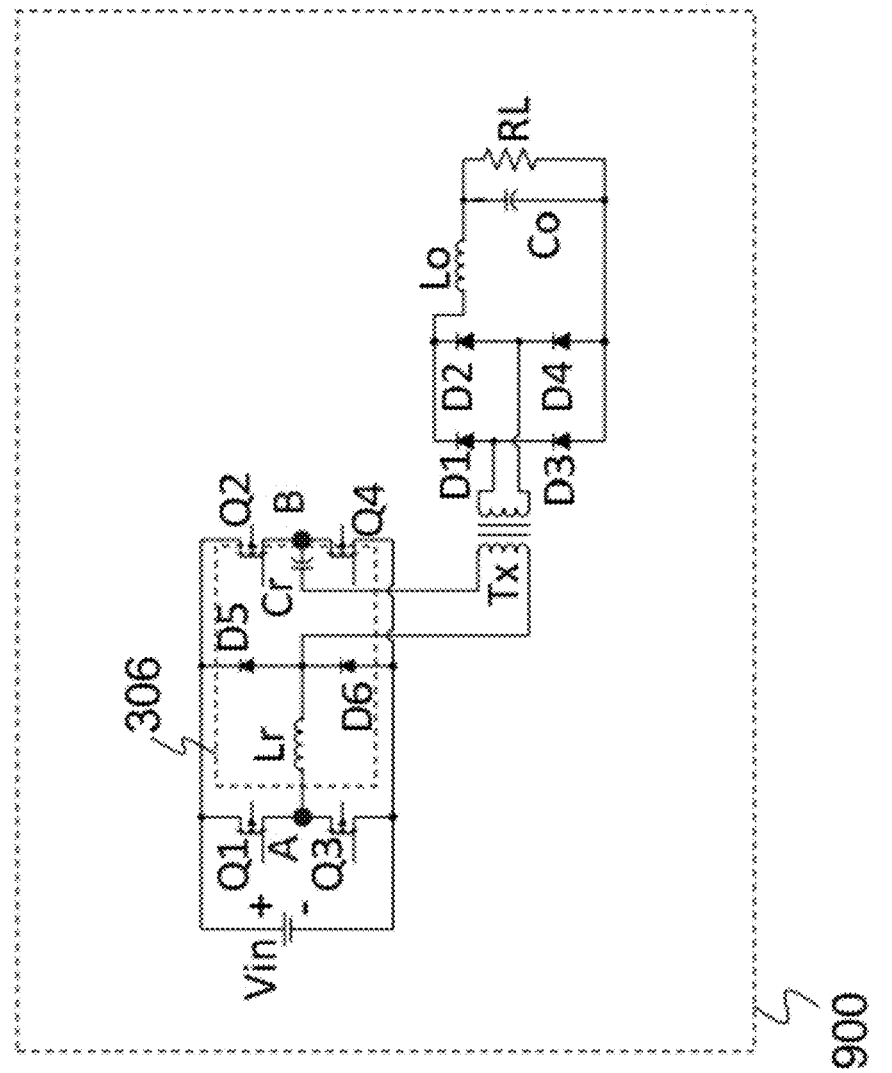
FIG. 9 illustrates the soft switching apparatus is applicable to a full bridge converter having a diode rectifier.

Referring now to FIGS. 9-12, the concept of adding the soft switching apparatus 200 into a full bridge converter can be extended to a family of bridge converters including full bridge converters having a secondary diode rectifier, and a half bridge converter having either a synchronous rectifier or a diode rectifier. The diode rectifier shown in FIG. 9 is known in the art. Replacing a synchronous rectifier shown in FIG. 4 with a diode rectifier generally has no impact on the operation of the soft switching apparatus 200. In fact, the soft switching apparatus 200 works in a similar way to that in FIG. 4.

Figure 10:
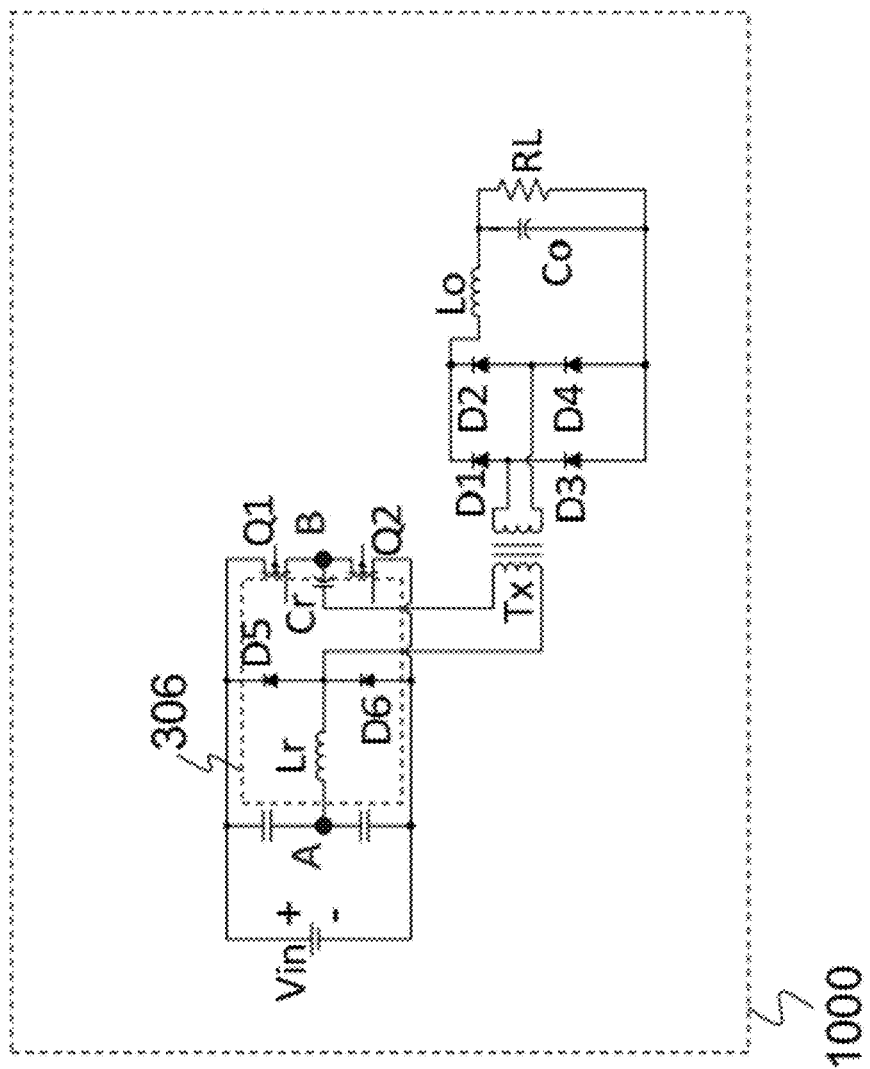
FIG. 10 illustrates the soft switching apparatus is applicable to a half bridge converter having a diode rectifier.
Figure 11:
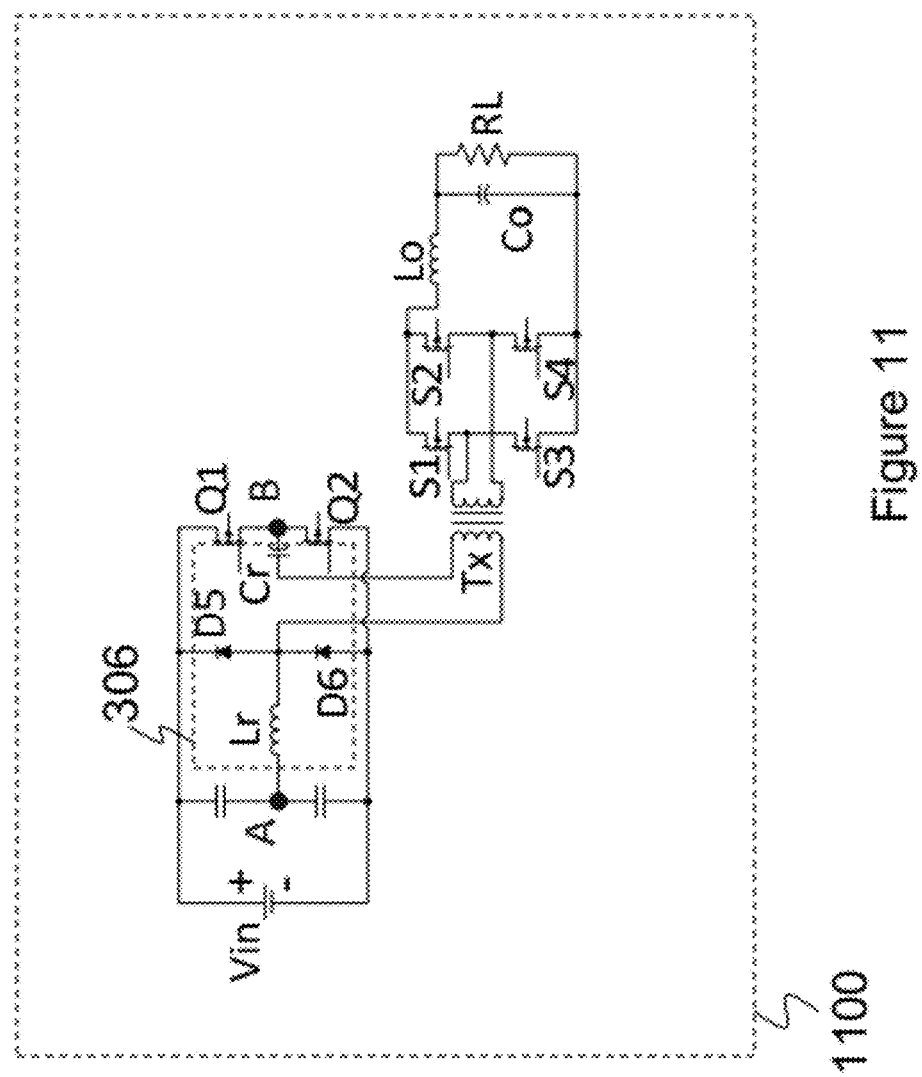
FIG. 11 illustrates the soft switching apparatus is applicable to a half bridge converter having a synchronous rectifier.
Figure 12B:
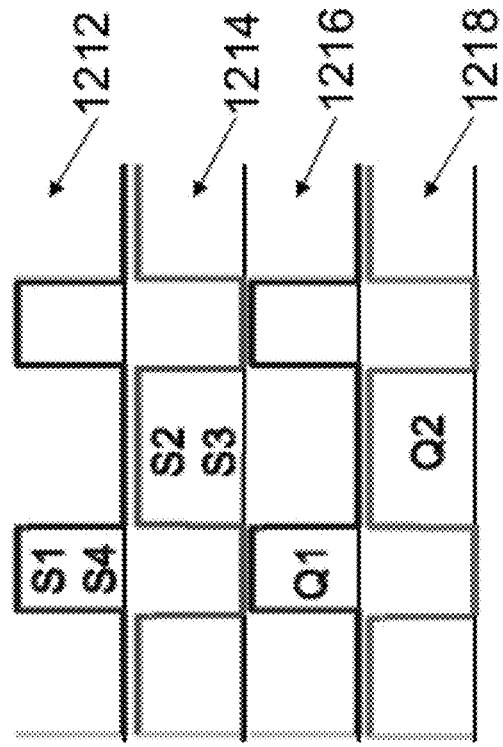
FIGS. 12A and 12B illustrates a plurality of control schemes applicable to half bridge converters.
Figure 12A:
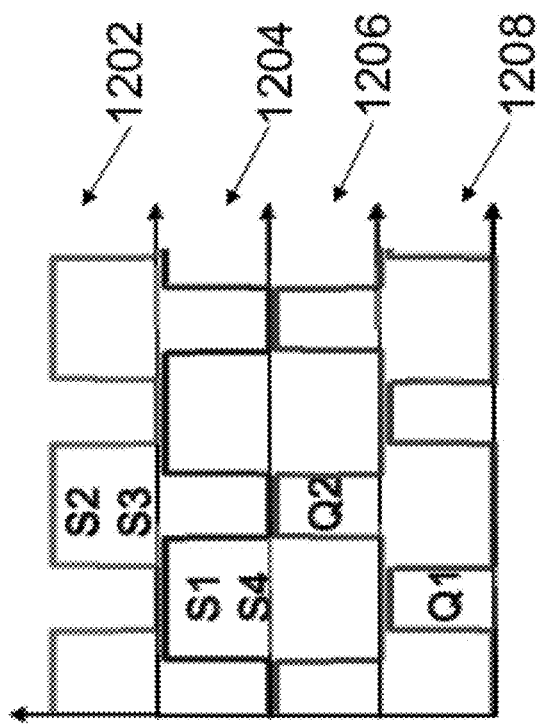

In FIG. 10, the soft switching apparatus 200 is applied to a half bridge converter. Similar to that in the full bridge converter 400, the soft switching apparatus 200 can reduce the amplitude of the primary side current in a freewheeling period as well as the voltage stress across the secondary rectifier. The operation of the circuits shown in FIG. 10 and FIG. 11 is similar except that the secondary of FIG. 11 employs a synchronous rectifier rather than a diode rectifier.

Furthermore, the soft switching apparatus 200 is applicable to half bridge converters having different control schemes. Even if a half bridge converter may have a different name by employing a different control scheme, the derivative from the basic half bridge converter is still within the scope of the present invention. For example, in FIG. 12A, waveforms 1202, 1204, 1206 and 1208 represent a fix duty cycle control of a half bridge converter. In contrast, FIG. 12B includes a set of waveforms 1212, 1214, 1216 and 1218 representing an asymmetrical duty cycle control scheme. Under such a control scheme, a half bridge converter is also called an asymmetrical half bridge converter. Nevertheless, the soft switching apparatus 200 is applicable to the asymmetrical half bridge converter too. A person having ordinary skill in the art will recognize a variety of alternatives are within the scope of the present invention. In summary, the soft switching apparatus 200 can be applied to a variety of bridge converters including half bridge and full bridge converters.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
 a first diode having an anode, and having a cathode coupled to a positive terminal of a DC source;
 a second diode having an anode coupled to a negative terminal of the DC source and a cathode connected to the anode of the first diode;
 an inductor coupled to the first diode and the second diode;
 a capacitor in series with the inductor; and
 wherein the inductor and the capacitor form a resonant tank and whereby the capacitor helps to reduce a current in the inductor during a freewheeling period.

2. The apparatus of claim 1, wherein the inductor, the capacitor and a primary side winding of a transformer of a bridge converter are in series connection to form a primary L-C tank.

3. The apparatus of claim 2, wherein the bridge converter is a full bridge converter.

4. The apparatus of claim 2, wherein the bridge converter is a half bridge converter.

5. The apparatus of claim 2, wherein the primary L-C tank has a first terminal connected to a first junction point at a first leg of the bridge converter and a second terminal connected to a second junction point at a second leg of the bridge converter.

6. The apparatus of claim 2, wherein two junction points are formed by placing the inductor, the capacitor and the primary side winding of the transformer of the bridge converter in series connection.

7. The apparatus of claim 6, wherein the cathode of the second diode and the anode of the first diode are connected to one of the two junction points.

8. A system comprising:
 a transformer having a primary winding and a secondary winding;
 a bridge circuit having at least one leg coupled to the primary winding;
 a rectifier coupled to the secondary winding;
 a first diode having an anode and a cathode coupled to a positive terminal of a DC source;
 a second diode having an anode coupled to a negative terminal of the DC source and a cathode connected to the anode of the first diode;
 an inductor coupled to the first diode, the second diode and the primary winding;
 a capacitor in series with the inductor; and
 wherein the inductor and the capacitor form a resonant tank and whereby the capacitor helps to reduce a current in the inductor during a freewheeling period.

9. The system of claim 8, wherein the secondary winding is center-tapped.

10. The system of claim 8, wherein the leg comprises first and second controllable switches.

11. The system of claim 8, further comprising a second leg having two controllable switches.

12. The system of claim 11, wherein the second leg comprises two capacitors.

13. The system of claim 8, wherein the rectifier comprises two switching devices coupled to a center-tapped secondary winding or comprises four switching devices coupled to the second winding.

14. The system of claim 8, wherein the rectifier comprises two diodes coupled to a center-tapped secondary winding or comprises four diodes coupled to the second winding.

15. The system of claim 8, wherein the inductor coupled to the primary winding is capable of reducing a current flowing through the rectifier when the rectifier is under a shoot-through condition.

16. The system of claim 8, further comprising a circuit generating a dead time between on times of a plurality of primary switches and a plurality of secondary switches.

17. The system of claim 15, wherein the dead time is approximately zero.

18. The system of claim 15, wherein there is an overlap between the on times of the plurality of primary switches and the plurality of secondary switches.

19. The system of claim 8, wherein the capacitor has an amount of capacitance capable of forming L-C resonance with the inductor to reduce a current flowing through the inductor during a freewheeling period by at least 20%.

20. A method comprising:
    providing a bridge having a first leg and a second leg;
    providing a transformer having a primary winding and a secondary winding, the primary winding being serially-connected to an inductor and a capacitor;
    providing an energy recovery channel formed by two diodes in series connection;
    forming a resonant tank by placing the inductor, the capacitor and the primary winding in series connection;
    coupling a rectifier to the secondary winding;
    coupling the energy recovery channel to the resonant tank at a junction point of the resonant tank;
    coupling a first terminal of the resonant tank to a first junction point of the first leg; and
    coupling a second terminal of the resonant tank to a second junction point of the second leg.

21. The method of claim 20, wherein the resonant tank is configured to reduce a current flowing through the inductor by at least 20% through during a freewheeling period.

22. The method of claim 20, wherein the inductor is configured to limit shoot-through currents flowing through the rectifier.

23. The method of claim 20, wherein the resonant tank and the energy recovery channel are configured to reduce voltage stress across the rectifier.

24. The method of claim 20, wherein the rectifier is formed by a group of switching devices or by a group of diodes.

25. The method of claim 20, wherein the first leg comprises two controllable switching devices in series connection.

26. The method of claim 20, wherein the second leg comprises either two controllable switching devices in series connection or two diodes in series connection.

27. The method of claim 20, wherein the secondary winding is center-tapped.

28. The method of claim 20, further comprising:
    providing a dead time between on pulses of one or a plurality of primary switches and one or a plurality of secondary switches; and
    setting the dead time to approximately zero.

29. The method of claim 27, further comprising providing an overlap between the on times of a plurality of primary switches and a plurality of secondary switches.

* * * * *